United States Patent [19]

Wait

[11] Patent Number: 4,991,343
[45] Date of Patent: Feb. 12, 1991

[54] PROCESS FOR PREVENTING THE SPREAD OF VEGETATION

[76] Inventor: Thomas R. Wait, 9350 Longmeadow Cir., Boynton Beach, Fla. 33436

[21] Appl. No.: 423,751

[22] Filed: Oct. 18, 1989

[51] Int. Cl.$^5$ .................. A01G 1/00; E02D 27/00
[52] U.S. Cl. .................................. 47/33; 52/102; 47/58; 47/1.5
[58] Field of Search ............... 47/33, 58, 1.5; 52/102; 256/1, 32

[56] References Cited

U.S. PATENT DOCUMENTS

| | | |
|---|---|---|
| 538,788 | 5/1895 | Moe ........................ 52/102 |
| 2,654,180 | 10/1973 | Redfield ................. 47/33 |
| 2,662,342 | 12/1953 | Peterson ................. 47/33 |
| 3,713,624 | 1/1973 | Niemann ................ 52/102 |
| 3,803,760 | 4/1974 | Matrey ................... 52/102 |
| 4,761,923 | 8/1988 | Reum ..................... 52/102 |
| 4,823,521 | 4/1989 | Kontz ..................... 52/102 |

FOREIGN PATENT DOCUMENTS 15425 of 1886 United Kingdom .................... 47/33

Primary Examiner—Henry E. Raduazo
Attorney, Agent, or Firm—Howard J. Greenwald

[57] ABSTRACT

A process for preventing the spread of vegetation from one area to another is disclosed.

In the first step of this process, a vegetation-encroachment barrier is provided. The barrier preferably contains two halves which are joined at their bottoms, whose tops are normally touching each other, but whose tops may be separated from each other. The two halves of the device are so shaped that, when their tops and bottoms are contiguous, a chamber between them is defined; the chamber exists at a location intermediate the tops and bottoms of the halves.

In the second step of the process, a furrow is dug around the area to be protected. Thereafter, the barrier is inserted into the furrow.

12 Claims, 6 Drawing Sheets

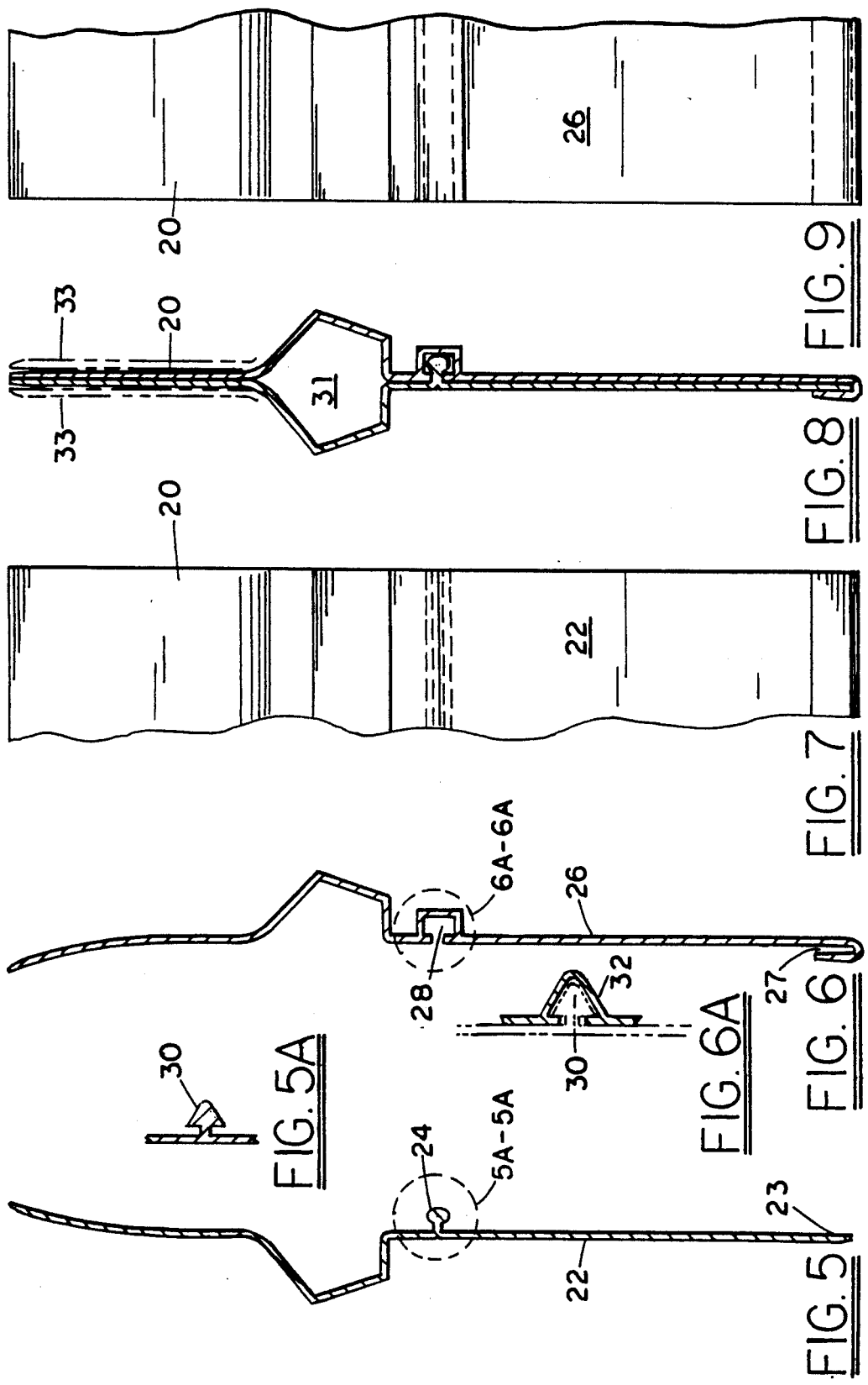

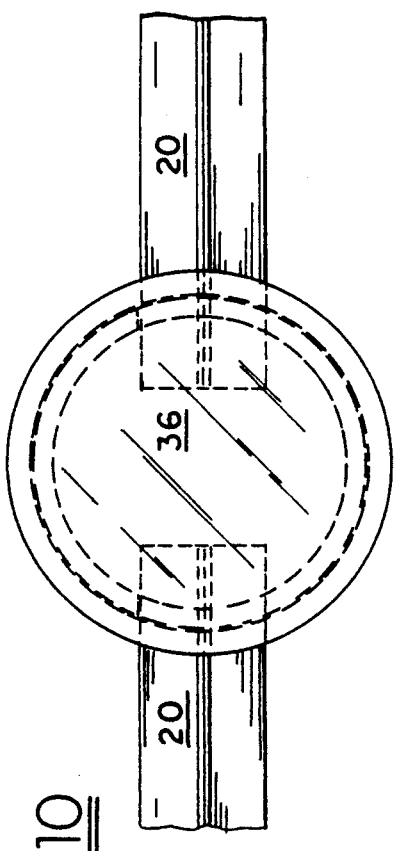
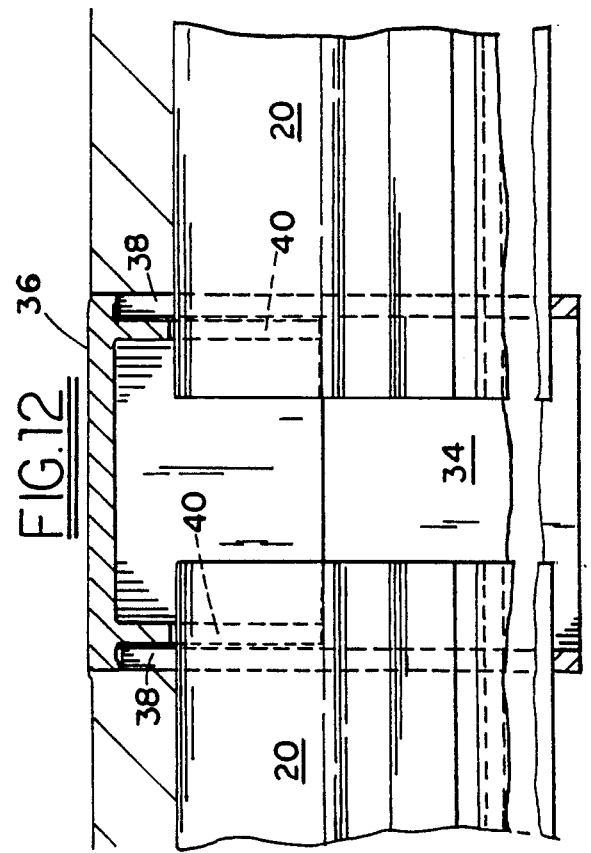
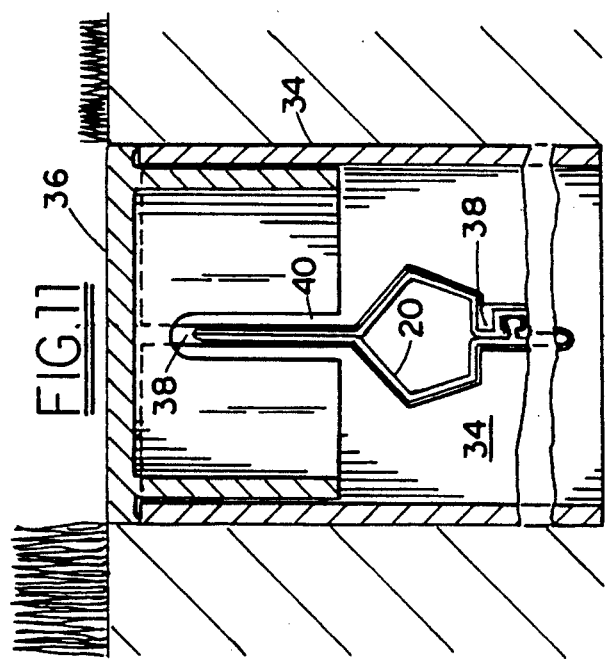

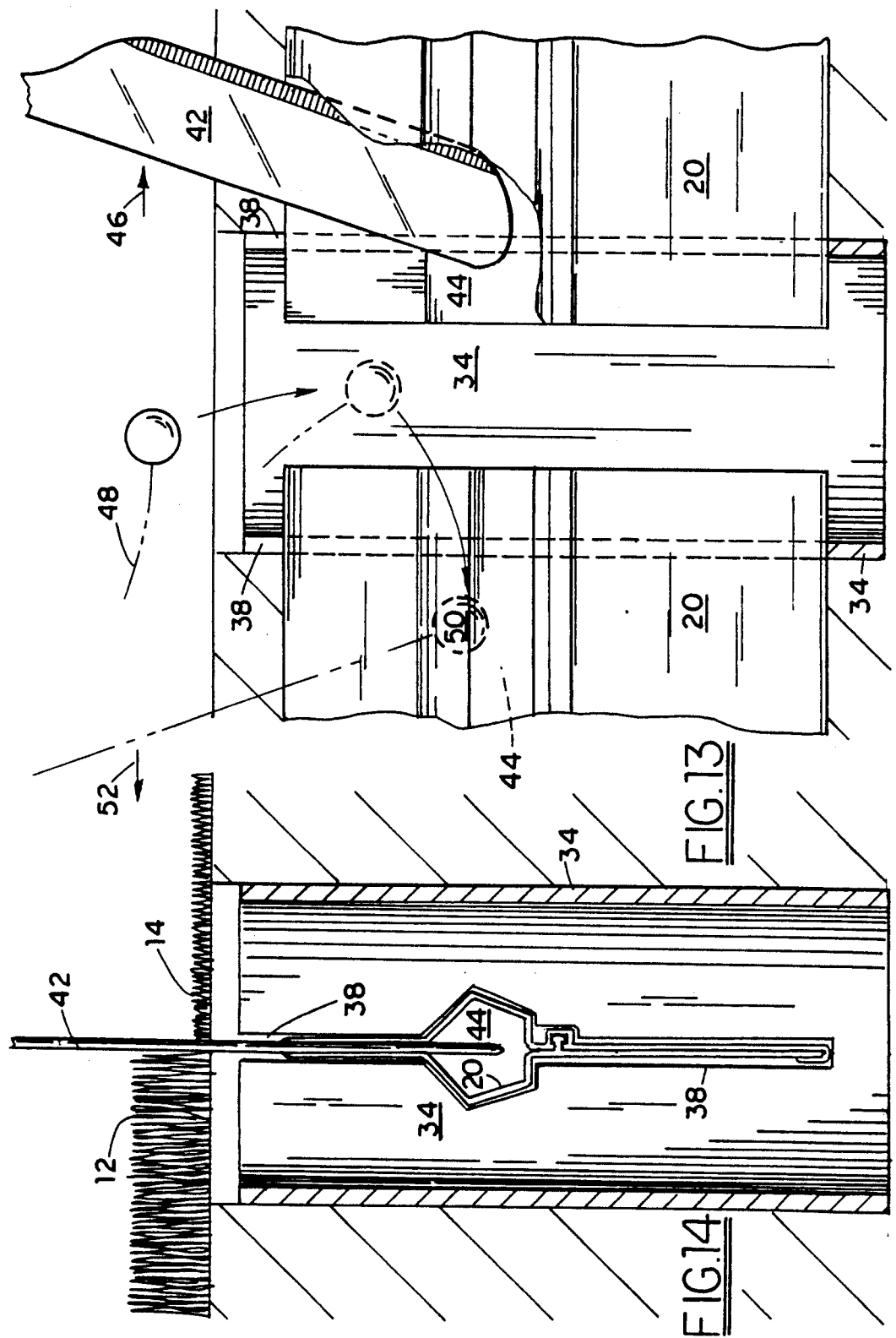

PROCESS FOR PREVENTING THE SPREAD OF VEGETATION

FIELD OF THE INVENTION

A process for preventing the spread of vegetation from one area to another in which a furrow is dug at a boundary and a barrier is inserted into the furrow.

BACKGROUND OF THE INVENTION

Golf greens are usually comprised of relatively fine, expensive grasses which usually are different from the grasses on the surrounding fairways. These fine grasses are used to provide a substantially unblemished surface on the green.

The relatively coarse grasses on the fairways surrounding the golf greens often contain hardier grasses which, if left unchecked, will encroach upon the golf green, crowd out the fine grasses on the greens, change the contour of the greens, and often destroy its unblemished surface.

One prior art method for combatting this problem is to continually weed, clip, or otherwise attack the invading course grasses. This method is very labor intensive, and very expensive. It is also less than totally efficient.

It is an object of this invention to provide an apparatus and a method for preventing the spread of coarse grasses onto a area consisting of fine grasses, such as a golf green. It is another object of this invention to provide an apparatus and method for trimming the boundary separating an area of coarse grass (such as a fairway) from an area of fine grass (such as a golf green). It is yet another object of this invention to provide a method and apparatus for inserting applicants' first apparatus into the ground between an area of coarse grass and an area of fine grass.

SUMMARY OF THE INVENTION

In accordance with this invention, there is provided a process for preventing the spread of vegetation from one area to another. In this process, a furrow is dug at a boundary between the areas and a plastic barrier is inserted into the furrow.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 5 is a cross-sectional view of the male half of the edging apparatus of FIG. 4 which is comprised of a locking means;

FIG. 5A is a cross-sectional view of the male half of another embodiment of the edging apparatus with a different locking means than that of the apparatus of FIG. 5;

FIG. 6 is a cross-sectional view of the female half of the edging apparatus of FIG. 4 which is comprised of a locking means;

FIG. 6A is a cross-sectional view of the female half of another embodiment of the edging apparatus with a different locking means than the apparatus of FIG. 6;

FIG. 7 is a side elevation of the male side of the green edging apparatus of FIG. 4;

FIG. 8 is a cross-sectional view of the green-edging apparatus depicted in FIG. 4;

FIG. 9 is a side elevation of the female half of the apparatus depicted in FIG. 4;

FIG. 10 is a top view of the junction between the ends of two green edging apparatuses, such as those illustrated in FIG. 4;

FIG. 11 is a cross-sectional view of the junction depicted in FIG. 10;

FIG. 12 is a longitudinal, cross-sectional view of the junction depicted in FIG. 10;

FIG. 13 is a view similar to that of FIG. 12 showing, in addition, means for trimming grass growing between the junction of fine grass and coarse grass;

FIG. 14 is a view similar to that of FIG. 11, showing, in addition, means for trimming grass growing between the junction of fine grass and coarse grass;

DESCRIPTION OF THE PREFERRED EMBODIMENTS

Figure 1:
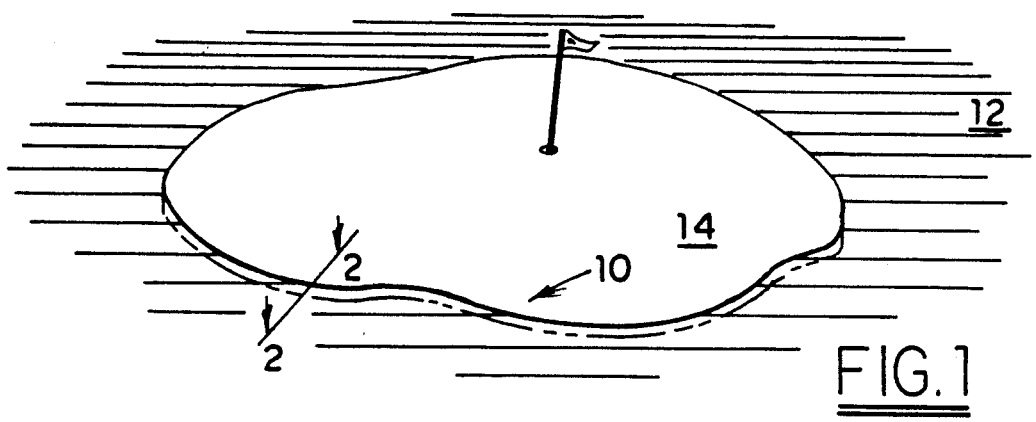
FIG. 1 is an aerial view of a golf green.

FIG. 1 is an aerial view of a typical golf green 14 into which a green edging means 10 of this invention has been installed around the periphery of the green. The use of apparatus 10 tends to prevent the encroachment of coarse grass 12 upon green 14. It may also be used to prevent the spread of other vegetation in areas other than a golf course.

Figure 2:
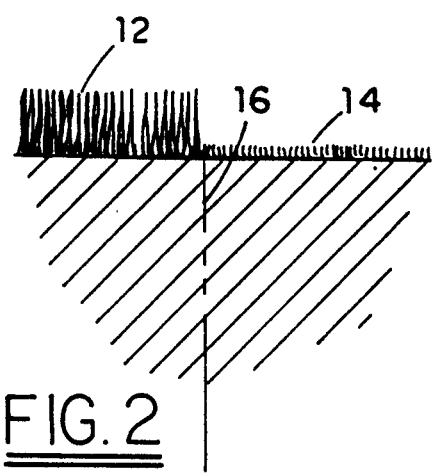
FIG. 2 is a cross-sectional view, taken along line 2—2 of FIG. 1, showing a line of demarcation between golf green grasses and golf fairway grasses.

FIG. 2 illustrates the desired line of demarcation 16 between coarse grass 12 on a golf fairway and fine grass 14 on a golf green. Boundary line 16 is often difficult and expensive to maintain on most golf courses.

Figure 3:
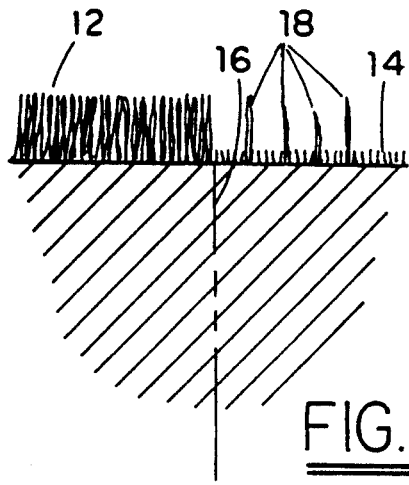
FIG. 3 is a cross-sectional view, similar to that of FIG. 2, showing the encroachment of fairway grasses upon the golf green grasses.

FIG. 3 illustrates the problem with the tendency of most coarse grasses to encroach upon weaker, less agressive fine grasses. Coarse grass 12 is shown in this Figure having sent shooters 18 in the area of fine grass 14. Both coarse grass 12 and fine grass 14 share the same soil, and there is nothing to prevent the more agressive coarse grass 12 from spreading into the area of the fine grass 14, crowding it out and killing it.

Figure 4:
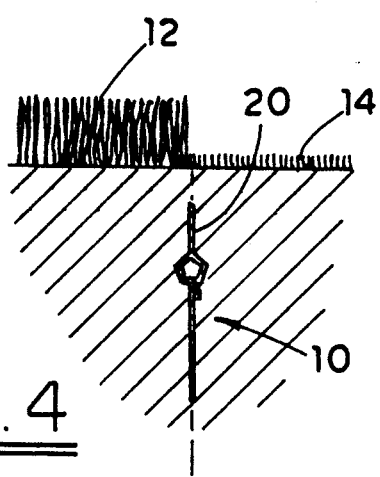
FIG. 4 is a cross-sectional view, similar to that of FIG. 2, showing a preferred embodiment of applicants' edging apparatus inserted in the ground between a golf green and a fairway.

FIG. 4 illustrates one preferred embodiment of applicants' solution to the problem of encroachment shown in FIG. 3. Applicants' encroachment apparatus 20 is preferably inserted into the ground at the line of demarcation 16 between fine grass 14 and coarse grass 12 after a furrow has been cut into the ground.

Applicant's preferred encroachment device 20 is illustrated in FIGS. 5 through 9. Encroachment encroachment device 20 preferably consists essentially of plastic material.

As used in this specification, the term plastic material refers to a material which is a high polymer, which is usually synthetic, and which can be formed or molded under heat and pressure in its raw state and machined to high dimensional accuracy, trimmed, and finished in its hardened state. The high polymer material in the plastic often represents at least about 50 weight percent of the plastic, and the remainder may (but need not) comprise materials such as curatives, fillers, reinforcing agents, colorants, plasticizers, other inert materials, and the like. See, for example, pages 924 to 925 of N. Irving Sax's et al. "Hawley's Coundensed Chemical Dictionary," Eleventh Edition (Van Nostrand Reinhold Company, New York, 1987), the disclosure of which is hereby incorporated by reference into this specification.

One preferred class of plastic material which can be used in the greens encroachment device 20 of this invention is the class of plastics known as synthetic addition products. These materials are well known to those skilled in the art and are described, e.g., on pages 374 to 538 of Brage Golding's "Polymers and Resins" (D. Van Nostrand Company, Inc, Princeton, N.J., 1959), the disclosure of which is hereby incorporated by reference into this specification. By way of illustration and not limitation, suitable synthetic addition products include, e.g., aliphatic hydrocarbons and derivatives such as polyethylene, chlorosulfonated polyethylene, polypropylene, butyl rubber, and the like; aliphatic vinyl and vinylidene compounds such as poly(vinyl chloride), vinyl chloride copolymers, and the like.

It is preferred that encroachment device 20 comprise at least about 90 weight percent of a thermoplastic material. The term thermoplastic material, as used in this specification, refers to a high polymer that softens when exposed to heat and returns to its original condition when cooled to room temperature. Suitable thermoplastic materials include polyvinyl chloride, linear polyethylene, polyurethane prepolymer, polystyrene, polypropylene, cellulosic and acrylic resins, and the like.

It is preferred that encroachment device 20 be comprised of at least about 90 weight percent of a thermoplastic plastic material selected from the group consisting of polyethylene, polypropylene, poly(vinylchloride), and mixtures thereof.

In one embodiment, encroachment device 20 is comprised of at least 90 weight percent of poly(vinyl chloride). As is known to those skilled in the art, poly(vinyl chloride) is a tough, whitish polymer which can be formed into strong films, tubes, and fibers that are highly resistant to hydrocarbon solvents. See, for example, pages 584–585 of the "MaGraw-Hill Encyclopedia of Science & Technology," Volume 10 (McGraw-Hill Book Company, New York, 1977), the disclosure of which is hereby incorporated by reference into this specification.

In one preferred embodiment, encroachment device 20 is comprised of at least about 90 weight percent of polypropylene. As is known to those in the art, polypropylene is a sythetic, crystalline, thermoplastic polymer with a molecular weight of 40,000 or more. See, e.g., page 942 of N. Irving Sax's "Hawley's Condensed Chemical Dictionary," supra.

In one especially preferred embodiment, encroachment device is comprised of at least 90 weight percent of polyethylene. In the remainder of this specification, a discussion will be had with regard to this embodiment. It should be understood, however, that many of the comments relating to the polyethylene embodiment are applicable to other embodiments.

Polyethylene is a group of polyolefin polymers derived from ethylene by polymerization by heat and pressure. Polyethylenes are usually classified by density (specific gravity) into low density polyethylene (0.910 to 0.925 grams per cubic centimeter), medium density polyethylene (0.926 to 0.940 grams per cubic centimeter), and high density polyethylene (0.941 to 0.959 grams per cubic centimeter). Mixtures of polyethylenes may be used to provide a product with a specified density. In one especially preferred embodiment, the density of the polyethylene used is from about 0.925 to about 0.950 grams per cubic centimeter. In an even more preferred embodiment, the density of the polyethylene composition is from about 0.940 to about 0.950 grams per cubic centimeter.

The density of the plastic material used in encroachment device 20 may be measured in accordance with A.S.T.M. Standard Test D792-86, "Test Method for Specific Gravity (Relative Density) and Densioty of Plastics by Displacement," Volume 08.01, the disclosure of which is hereby incorporated by reference into this specification.

The polyethylene material(s) which preferaby comprise at least about 90 weight percent of encroachment device 20 preferably have a water absorption of less than 1.0 percent. As is known to those skilled in the art, a material's water absorption capabilities is a function of its hydrophilicity. The water absorption of the thermoplastic material in encroachment device 20 may be measured in accordance with A.S.T.M. Standard Test D570-81, "Test Method for Water Absortion of Plastics," Volume 08.01, the disclosure of which is hereby incorporated by reference into this specification.

The polyethylene material which preferably comprises at least about 90 weight percent of encroachment device 20 has a flexural modulus of from about 120,000 to 180,000 pounds per square inch. The flexural modulus of thermosplastic material may be determined in accordance with A.S.T.M. Standard Test D790-86, "Test Methods for Flexural Properties of Unreinforced and Reinforced Plastics and Electrical Insulating Materials," Volume 08.01, the disclosure of which is hereby incorporated by reference into this specification.

The polyethylene material which preferably comprises at least about 90 weight percent of the greens encroachment device 20 preferably has a Shore/Barcol hardness of from about Shore D58 to about Shore D70. These hardness measurements may be made in accordance with A.S.T.M. Standard Test D2583-87, "Test Method for Indentation Hardness of Rigid Plastics by Means of a Barcol Impressor," Vol. 08.02, the disclosure of which is hereby incorporated by reference into this specification.

The polyethylene material which preferably comprises at least 90 weight percent of the encroachment device 20 preferably has a tensile strength of from about 1200 to 3500 pounds per square inch. This tensile property may be measured in accordance with A.S.T.M. Standard Tests D638-87B, Volume 08.01, "Test Method for Tensile Properties of Plastics," the disclosure of which is hereby incorporated by reference into this specification.

In one embodiment, the polyethylene used in device 20 has substantially the properties specified for medium density polyethylene on page C781 of the "CRC Handbook of Chemistry and Physics," 63rd Edition (CRC Press, Inc., Boca Raton, Fla., 1982), the disclosure of which is hereby incorporated by reference into this specification.

Referring to FIGS. 5 through 9, encroachment device 20 is comprised of male component 22 and female component 26, both of which consist essentially of the aforementioned plastic material. These components are preferably made of such plastic material by a continuous plastic extrusion process and cut to lengths that can be readily handled during the installation of the device 20 into the ground. Conventional plastic extrusion processes may be used to prepare these components. See, e.g., pages 594 to 602 of Brage Golding's "Polymers and Resins," supra.

The two halves of device 20, 22 and 26, are joined together by means for locking such halves together so that, in one preferred embodiment, the bottom portions of these halves are securely interlocked to each other, but the top portions of these halves may separate from each other when a cutting means is inserted between the top walls of said halves. Thus, in this embodiment, the device contains means for attaching the bottom portions of the halves of the two devices to each other and allowing the top portions of these halves to be separated while maintaining the attachment of the bottom portions of the halves to each other.

Any means for locking halves 22 and 26 together may be used in encroachment device 20. In the preferred embodiment shown in FIGS. 5, 5A 6, and 6A, said locking means comprise U-shaped area 27 of half 26 into which the bottom edge 23 of half 22 is inserted; and they also comprise continuous female bead receptacle 28 of half 26 into which male bead 24 is inserted.

As is shown in FIG. 8, the two halves, 22 and 26, are joined together to form the edging asembly 20 by first inserting bottom edge 23 of half 22 into U-shaped area 27 of half 26, and also inserting male bead 24 of half 22 into continuous female bead receptacle 28 of half 26. This joint then gives a firm juncture below clearance chamber 31. Above clearance chamber 31, the two halves 22 and 26 are free to part to a limited extent, as shown by dotted lines 33 in FIG. 8.

As will be apparent to those skilled in the art, other means for securing the bottom portion of half 22 to the bottom portion of half 26 while allowing the top portions of these halves to be able to separate to a limited extent also may be used in the device of this invention.

FIG. 5A and 6A illustrate one preferred alternative embodiment for said locking means. Triangular male bead 30 may be used instead of circular male bead 24 and, when so used, should be used in conjunction with triangular female receptacle 32 (which will replace female bead receptacle 28). These locking arrangements are merely illustrative, and many other means for interlocking halves 22 and 26 will be apparent to those skilled in the art.

In one preferred embodiment, ilustrated in FIG. 8, half 22 and half 26 are so configured that, when they are joined together by said locking means, a clearance chamber 31 is formed. This clearance chamber is defined by halves 22 and 26 intermediate the top portions of said halves and the bottom portions of said halves.

Clearance chamber 31 allows dirt from the other part of device 20 to reside in said chamber, from which it may ultimately be removed by suitable removal means. Clearance chamber 31 also provides a space for the bottom of a blade (shown as 42 in FIG. 13) to ride in without encountering a substantial amount of friction. Clerance chamber 31 also tends to anchor device 20 in the ground. This clearance chamber helps prevent device 20 from collapsing when it is bent around the golf green countour. Lastly, clearance chamber 31 provides an orifice through which a ball guide (see FIG. 15) may be passed to trim grass around a golf green.

In the embodiment illustrated in FIG. 8, clearance chamber 31 has a pentagonal shape. In the embodiment shown in this Figure, the sides of pentagonal clearance chamber 31 are not equal. In another embodiment, not shown, the sides of such chamber 31 may be equal.

Referring again to FIG. 8, in the preferred embodiment of this Figure each of halves 22 and 26 is from about 7 to 8 inches long; and the 7-8 inch length of device 20 tends to prevent the shooters of the coarse grass from invading the finer green grass. In this embodiment, the top of clearance chamber 31 is from 2 to about 4 inches from the top of device 20, the bottom of clearance chamber 31 is from 4 to 5 inches from the bottom of device 20, and the top of clearance chamber 31 is from about 1 to about 1.25 inches from the bottom of clearance chamber 31.

As will be apparent to those skilled in the art, the shape, the location, and the size of clearance chamber 31 may be varied. However, it is prefered that clearance chamber 31 be located in the upper half of device 20.

The thickness of the walls of halfs 22 and 26 should preferably be from about 0.05 to about 0.09 inches.

Clearance chamber 31 may define a shape other than a pentagon. Thus, by way of illustration and not limitation, clearance chamber 31 may have an oval shape, a circular shape, a square shape, a triangular shape, an irregular shape, a rectangular shape, and the like.

The perimeter of a golf green is relatively long and usually precludes greens encroachment device 20 from being handled and buried in one piece. Thus, in one preferred embodiment, a junction 36 is provided to join two or more sections of greens encroachment device 20. Such a junction 36 is illustrated in FIGS. 10 through 12; and it allows for any number of assemblies 20, cut to convenient lengths, to be installed around a golf green in accorance with the particular measurements of the green.

It is preferred to use at least one junction for every 150 to 200 linear feet of greens encroachment device 20. However, as will be apparent to those skilled in the art, more junctions 34 may be used if desired. Applicants' system is flexible and allows for any number of pieces of edging assemblies 20 to be cut to convenient lengths and to be installed around a golf green.

The junction is made by the use of an edging assembly joint tube 34 set into the ground at the point of the junction. Joint tube 34 has appropriate orifices, such as holes or slots 38, cut into the tube 34 in locations which are preferably diametrically opposed. The ends of the green edging assembly 20 are inserted into these orifices by a desired amount, usually by about 1 to about 2 inches. A joint cover tube 36 is inserted into joint tube 34 in order to cover the upper end of the tube 34 that is even with the ground surface. Clearance slots 40 are cut into diametrically opposed locations in the cover 36 to allow for clearance around the ends of assemblies 20 when the cover 36 is installed.

Once the golf green edging system 10, comprised of green edging assemblies 20 and joint tubes 34, is installed around the periphery of a golf green, there are at least two methods of ridding the area along the line of demarcation 16 between fairway grass 12 and golf green grass 14 of fairway grass 12 or any of its root system that is encroaching into the green grass. The first method, illustrated in FIGS. 13, 14 and 16, involves inserting a grass root cutting blade into the greens edging assembly 20 between the two halves of the assembly 22 and 26 above the pentagonal hole 31 (see, e.g., FIG. 14). Entry into the end of the green edging assembly may be made at such end where it protrudes into edging assembly joint tube 34. The blade is then pulled in the direction of arrow 46, being constantly guided by green edging assembly 20 until the next edging joint tube is reached. At that time, the process may be repeated using the next section of green edging assembly 20 as a blade guide until the entire periphery of the golf green is cleared of fairway grass 12 and its attendant root system.

Figure 16:
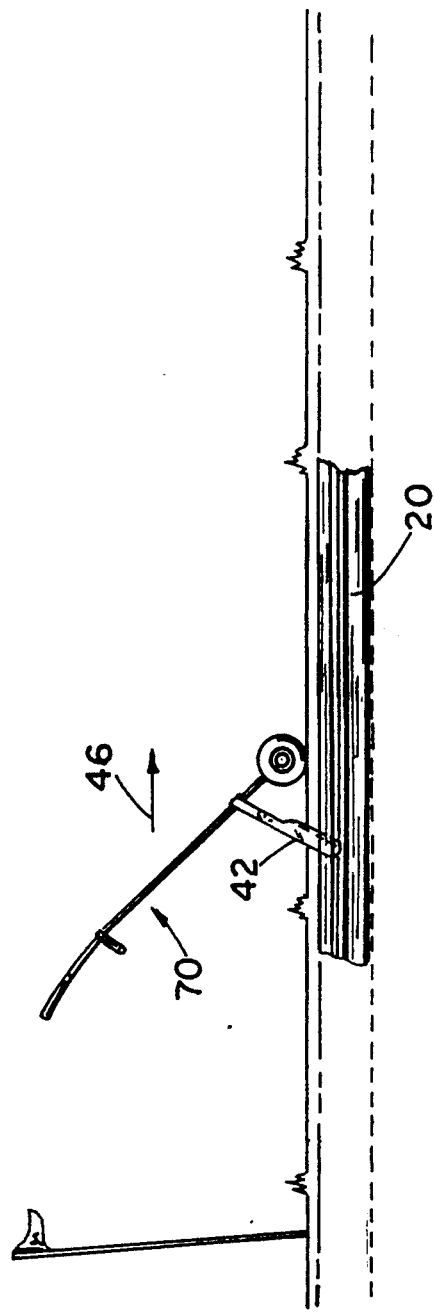
FIG. 16 is a side view of another means for trimming grass growing between the junction of fine grass and coarse grass.
Figure 17:
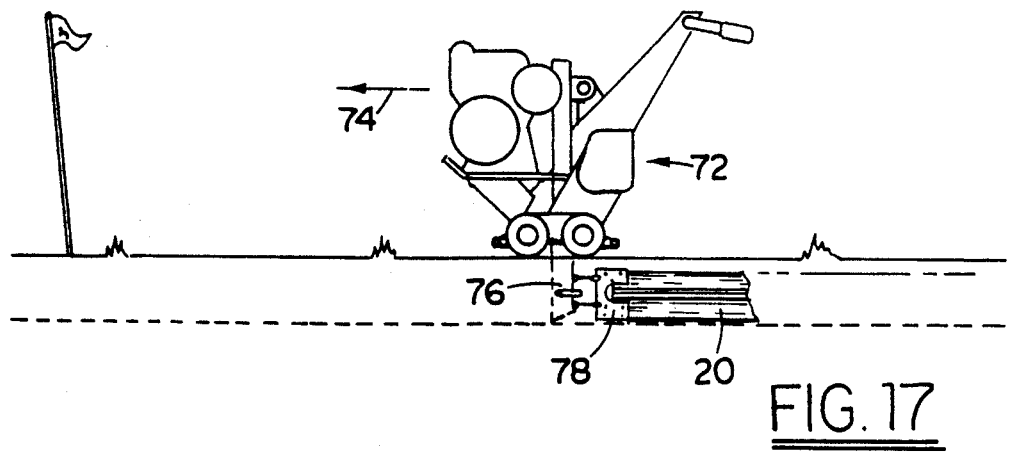
FIG. 17 is a side view of an apparatus for installing the green edging apparatus of FIG. 4 into the ground.
Figure 19:
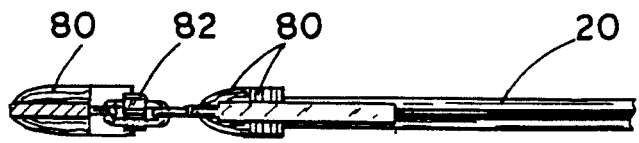
FIG. 19 is a top view of the blade depicted in FIG. 18.
Figure 18:
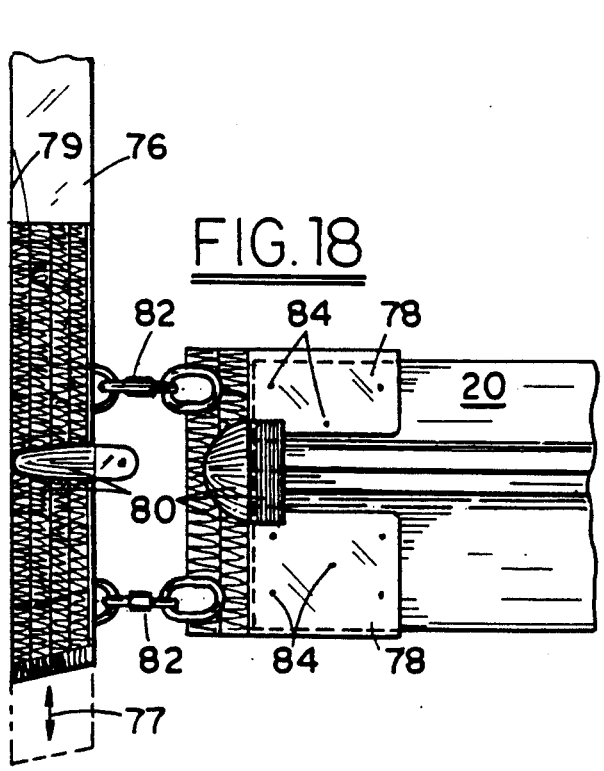
FIG. 18 is a side view of a blade which can be used in the apparatus of FIG. 17.
Figure 20:
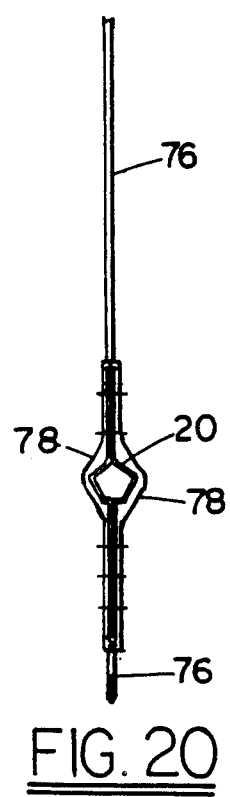
FIG. 20 is a end view of the blade of FIG. 18 with the edging assembly of FIG. 4 inserted into it.

FIG. 16 shows blade 42 mounted on a blade carrier vehicle 70 and propelled in direction 46. As will be apparent to those skilled in the art, such a blade carrier may take many forms such as, e.g., a simple knife, a riding, self-propelled unit, and embodiments in between.

Figure 15:
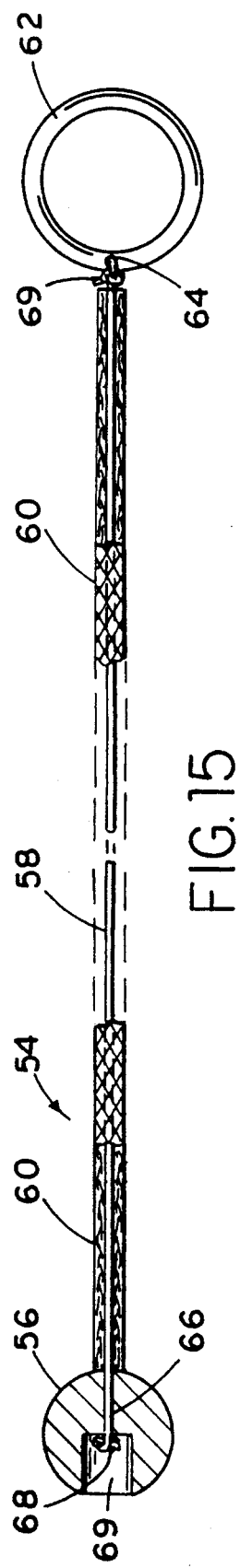
FIG. 15 is cross-sectional view of one means for trimming grass growing between the junction of fine grass and coarse grass.

In another preferred embodiment, chemical and mechanical means are used to rid the boundary 16 of fairway grass; this embodiment is illustrated in FIGS. 13 and 15. Referring to FIG. 15, a ball and rope assembly 54 is comprised of a ball 56, a steel cable 58, and a ring 62. The steel cable is sheathed with a rope 60. One end of the steel cable is inserted into ball hole 66 and further into ball counterbore 69, wherein knot 68 is tied for retention. The other end of cable 58 is inserted into hole 64 of ring 62 and is secured by knot 69.

Referring to FIG. 13, ball and rope asembly 54, shown in phantom outline 48, may be dropped into junction tube 30 in such a manner that the ball 56 of ball and rope assembly 54 may assume ball position 50 inside green edging assembly guide channel 44. By pulling the rope and ball assembly in direction 52, the fairway grass and its root structure may be treated with liquid herbicides wicked into the area by means of rope 60. As the rope is pulled along, it will tend to disrupt the fairway grass and its root structure in a manner similar to the aforementioned blade.

The greens edging assembly is preferably buried around the peripheral of the area to be protected, such as, e.g., the greens edges of a golf course. A furrow is preferably dug around the area to be protected from the spread of vegetation. This furrow may be dug by any conventional means. Thus, it may be dug by simple trenching with a spade or the like; however, this method is highly labor intensive and expensive. In one embodiment, the furrow is dug and the assembly 20 inserted into the furrow by conventional machinery suitable for this purpose.

U.S. Pat. No. 4,198,103 of Ward et al. discloses a track assembly for a vehicle comprising powered wheels at each side, and an endless track sleeved over the wheels on each side having solely a smooth driven surface friction contact with the associated wheels (see, e.g., the abstract of this patent); the disclosure of this U.S. patent is hereby incorporated by reference into this specification.

FIGS. 17 through 20 illustrate a commercially available machine 72, similar to that described in U.S. Pat. No. 4,198,103, modified to both dig a trench for green edging assembly 20 as well as to pull it along until the full length of the edging assembly section is in its proper position underground. Machine 72 has a blade 76 that moves upward and downward as shown by arrow 77. The blade 76 has cutting edge 79, and its flanks are covered with welding beads 80 which serve to, in effect, make a massive file of the blade to aid its passage through the earth in direction 74. By means of chain links 82, an adaptive member 78 is attached to blade 76. The adaptive member 78 is attached to the end of green edging assembly 20 by means of fastener 84. When machine 72 moves along in direction 74, it pulls the green edging assembly 20 along through the trench reciprocating blade 76 has dug for it. While the blade 76 reciprocates, the green edging assembly 20, though connected to the blade, does not due to the swivelling effect of the attached chain links 82 and the gripping power of the welding beads 80, on the leading edge of adapter 78, against the sides of the trench.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A process for preventing the spread of vegetation from one area to another, comprising the steps of:
   (a) providing a flexible, in-ground plastic, vegetation-encroachment barrier comprised of at least a first wall and a second wall, wherein:
      (1) each of said first wall and said second wall comprises a bottom portion and a top portion and has a thickness of from about 0.05 to about 0.09 inches;
      (2) said vegetation-encroachment barrier is comprised of means for attaching said bottom portions of said first wall and said second wall to each other;
      (3) the bottom portion of said first wall is attached to the bottom portion of said second wall, and the top portion of said first wall is contiguous with and separable from the top portion of said second wall;
      (4) said first wall and said second wall are so configured that, when the bottom portion of said first wall is contiguous with the bottom portion of said second wall, and when the top portion of said first wall is contiguous with the top portion of said second wall, a chamber is defined by said first wall, which chamber is intermediate between the tops of said walls and the bottoms of said walls;
   (b) providing a means for separating vegetation;
   (c) disposing said means for separating vegetation between said first wall and said second wall and, simultaneously, separating said top of said first wall from said top of said second wall; and
   (d) moving said means for separating vegetation between said first wall and said second wall.

2. The process as recited in claim 1, wherein said plastic is a synthetic addition product.

3. The process as recited in claim 2, wherein said vegetation encroachment barrier is comprised of at least about 90 weight percent of a thermoplastic material.

4. The process as recited in claim 3, wherein said thermoplastic material consists essentially of poly(vinyl chloride).

5. The process as recited in claim 3, wherein said thermoplastic material consists essentially of polypropylene.

6. The process as recited in claim 3, wherein said thermoplastic material consists essentially of polyethylene.

7. A flexible plastic, vegetation-encroachment barrier comprised of at least a first wall and a second wall, wherein:
   (a) each of said first wall and said second wall comprises a bottom portion and a top portion and has a thickness of from about 0.05 to about 0.09 inches:
   (b) said vegetation-encroachment barrier is comprised of means for attaching said bottom portions of said first wall and said second wall to each other;
   (c) the bottom portion of said first wall is contiguous with the bottom portion of said second wall, and the top portion of said first wall is contiguous with and separable from the top portion of said second wall; and
   (d) said first wall and said second wall are so configured that, when the bottom portion of said first wall is cintiguous with the bottom portion of said second wall, and when the top portion of said first wall is contiguous with the top portion of said second wall, a chamber is defined by said first wall, which chamber is intermediate between the tops of said walls and the bottoms of said walls.

8. The barrier as recited in claim 7, wherein said plastic is a synthetic addition product.

9. The barrier as recited in claim 8, wherein said vegetation encroachment barrier is comprised of at least about 90 weight percent of a thermoplastic material.

10. The barrier as recited in claim 9, wherein said thermoplastic material consists essentially of poly(vinyl chloride).

11. The barrier as recited in claim 9, wherein said thermoplastic material consists essentially of polypropylene.

12. The barrier as recited in claim 9, wherein said thermoplastic material consists essentially of polyethylene.

* * * * *